Oct. 18, 1927.

H. A. MYERS 1,645,617

WINDOW REGULATOR

Filed June 17, 1925 2 Sheets-Sheet 1

Inventor

Hubert A. Myers

By Owen, Owen & Crampton

Attorney

Oct. 18, 1927. 1,645,617

H. A. MYERS

WINDOW REGULATOR

Filed June 17, 1925 2 Sheets-Sheet 2

Inventor

Hubert A. Myers

By Owen, Owen & Crampton
Attorney

Patented Oct. 18, 1927.

1,645,617

UNITED STATES PATENT OFFICE.

HUBERT A. MYERS, OF TOLEDO, OHIO, ASSIGNOR TO THE MYERS REGULATOR COMPANY, OF TOLEDO, OHIO, A CORPORATION OF OHIO.

WINDOW REGULATOR.

Application filed June 17, 1925. Serial No. 37,644.

My invention has for its object to provide a window regulator for automobiles wherein the cranks usually used for raising and lowering the windows may be directly connected to the window through a pinion and rack whereby uniform resistance to the movement of the crank will be produced notwithstanding the relative position of the window in the automobile frame, the construction being such that the window may be fully opened and the rack will not appear above the ledge or sill of the window or obtrude itself in the area of vision through the window, although the crank may be connected to the central part along the lower edge portion of the window. The invention also has for its object to provide a structure that may be installed as a unit and will contain a means for operating the window by a rack directly connected to the supporting U-bar of the window commonly used in connection with automobile windows, or to a bracket on which the window is supported. The advantage of directly connecting the window to a rack that is operated by a crank and pinion is that a uniform resisting pressure to rotation is produced in the crank, and all binding due to twisting caused by pressure against the window at different angles produced by the changing relation or angle or point of contact or connection between the window and the part that operates directly on the window to raise and lower it, is eliminated.

The invention may be contained in structures that differ in their details and structures containing the invention may be used for a variety of purposes. To illustrate a practical application of the invention I have shown a structure for raising and lowering the window of an automobile where the invention probably finds it best application. The structure selected as an example is shown in the accompanying drawings and is described hereinafter.

Figure 1:
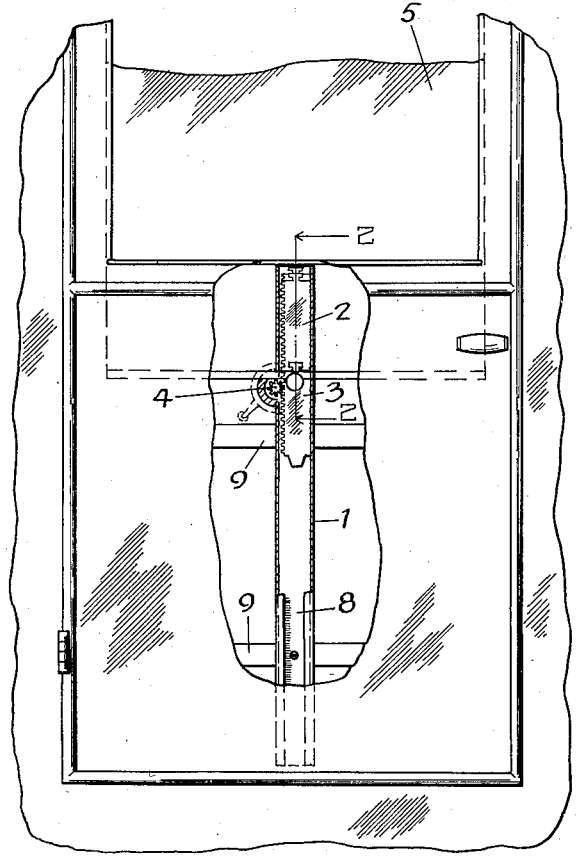
Figure 2:
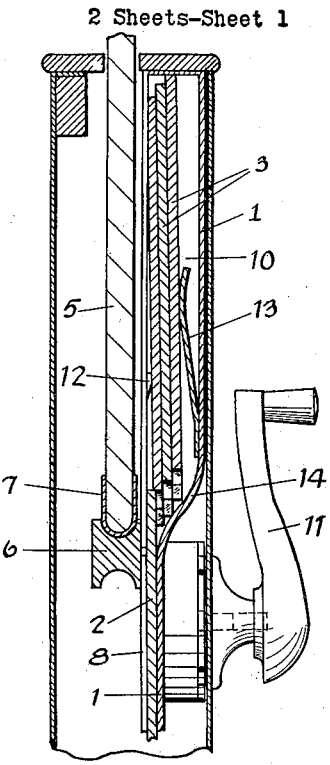
Figure 3:
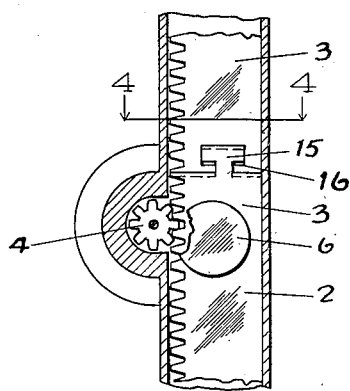
Figure 4:
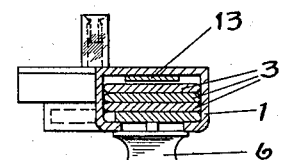
Figure 5:
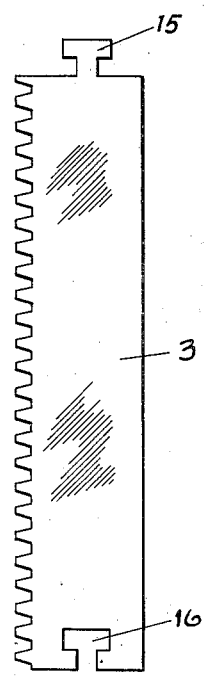
Figure 7:
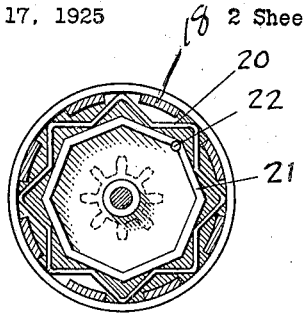
Figure 8:
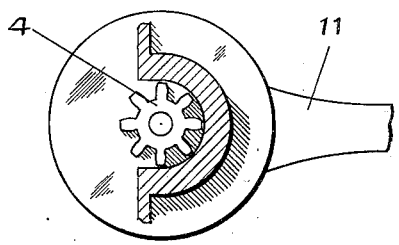
Figure 9:
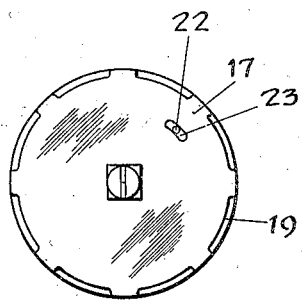
Figure 6:
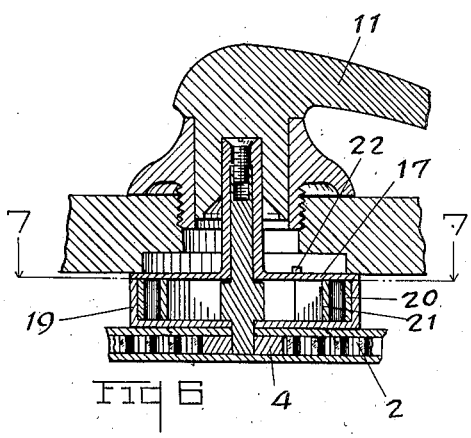

Figure 1 of the drawings illustrates the window regulator applied to an automobile window it being located in the "well" of a door frame of the automobile. Fig. 2 is an enlarged section taken on the plane of the line 2—2 indicated in Fig. 1. Fig. 3 illustrates an enlarged view of a part of the mechanism shown in Fig. 1. Fig. 4 is a view of a section taken on the plane of the line 4—4 indicated in Fig. 3. Fig. 5 illustrates a segment of the rack used in raising and lowering the window. Fig. 6 is a view of a section through the crank used for operating the rack. Fig. 7 is a view of a section taken on the plane of the line 7—7 indicated in Fig. 6. Fig. 8 illustrates an enlarged view of the pinion and a view of the shell for containing the locking mechanism for locking the window in its adjusted positions. Fig. 9 is a top view of the clutch releasing means.

Where the invention is used for raising and lowering automobile windows, its desirability is determined by its cheapness, efficiency and compactness which are the chief controlling factors. In order that the window regulator may be formed at a low cost of production and occupy a small space within the narrow window well of the automobile body frame, the structure is such that the parts may be formed largely of sheet metal and in order that there may be a direct uniform action between the crank and the window, the crank is directly connected through a rack and pinion to the window. Thus the structure is composed of a shell for containing all of the operative parts whereby the entire construction may be installed as a unit by merely connecting the shell in position. In the construction shown the shell 1 has a segmental or jointed rack 2 formed of the segments 3 that separate successively as they pass above the pinion 4 in raising the window and successively join as they pass the same point when the window is lowered. The rack 2 is connected to the window 5 by means of a bracket 6 which may be in the form of a grooved knob. The groove being such as to fit the U-edge-bar 7 of the window 5. One side wall of the shell 1 is provided with a slot 8 in which the bracket 6 is located and along which it may be moved as the rack 2 is raised by the operation of the pinion 4. The major portion of the shell 1 is made to conform substantially to the cross sectional dimensions of the rack 2 so as to guide and maintain the rack 2 in position. The shell also forms a means for pivotally supporting the pinion 4 and the mechanism for locking the rack in position so that the window 5 will be sustained in any position to which it may be raised or lowered by the operation of the pinion. Thus the regulator may be installed as a unit in the window well of the automobile frame and the window 5 connected to the rack 2 or the window may be placed on the supporting bracket 6. The shell 1 may be installed by merely securing it to cross bars 9 of the frame.

The shell 1 is provided with a pocket or enlarged portion 10 for receiving the segments as they are raised above the pinion, means being provided for disconnecting the segments 3 in succession from the remaining portions of the rack located in that portion of the shell 1 below the pocket 10. Thus the rack 2 may be connected to the central part of the lower edge of the window 5, that is, the supporting bracket 6 may be located below the center of the window 5 and the crank 11, that operates the pinion, may be located near the window ledge for convenience of operation and yet the rack will not appear above the ledge of the window and enter within the vision area of the window. The shell 1 may extend from the lower part of the well to the window ledge and be located entirely within the window well.

The segments 3 are disconnected as they pass a point located above the axis of the pinion and are reconnected when the rack is lowered and at the same point and so that the segments are at all times in position of alinement with the pinion in advance of it being operated upon by the pinion, by a means that will cause the segments to tilt slightly and as the segments advance the ends will push the preceding segments to one side in the pocket 10 and cause disconnection between the segments and as the ends of the segments are lowered reconnection will be made by reason of the operation of the means that causes the segments to tilt when they are in the pocket.

The shell 1 is provided with a pair of lugs 12 that are located on each side of the slot 8. The lugs 12 having inclined surfaces to prevent engagement of the lugs 12 with the ends of the segments. A spring 13 is also located in the pocket and is secured at one end to the shell 1. The other end presses against the segments of the rack at a point above the lugs 12 so that the segments that are located in the pockets are tilted towards the slotted wall of the shell. Also the lower end of the pocket 10 is inclined towards the slotted wall of the shell as at 14 which by reason of the weight of the segments 3 cause the lower ends of the segments 3 to be pressed forward towards the portion or portions of the rack located in the body of the shell below the pocket. Thus when the first or uppermost segment 3 rises above the pinion 4 it will be engaged by the inclined surfaces of the lug 12 and then by the spring 13 and it will be tilted forward and disengage it from the other parts of the rack. As the next segment is moved upward by the pinion 4 it will engage the first segment at a point beneath the lug 12 and as its end moves upward it will push the first segment to one side and when it rises near the top of the pocket it will be tilted towards the slotted wall of the shell by the spring 13 and the lug 12 is likewise disconnected from the remainder of the rack located in the shell 1 below the pocket 10. On the other hand when the end of the segment of the rack is drawn from the pocket 10 it slides downward gradually reducing the inclination of the segments in the pocket since the thickness of the lugs 12 as measured horizontally is less than the thickness of the segments and as the end of the segment that is thus moved down by the pinion, passes the lower end of the segment in contact therewith and located within the pocket 10 it engages the end of the segment that is thus being moved downward by the pinion and it is likewise drawn from the pocket 10 and engaged by the pinion 4. As the rack moves down, the succeeding segment is caught and likewise carried down until all of the segments may be removed from the pocket 10. Thus the pocket 10 forms a storage for receiving the segments that are raised above the pinion and their appearance above the window ledge is avoided. Any suitable dove-tailing or engaging means may be provided for inter-engaging the segments. In the form of construction shown a tongue 15 is located at one end of each of the segments and the other end of each of the segments is provided with a slot 16 that is shaped to receive the tongue. The shape of the tongue 15 and the slot 16 are such that the end portions of the segments will be interengaged. The tongue 15 has laterally extending portions that will fit into the slot 16 that is shaped accordingly. When, therefore, the segments enter the pocket 10 the segments will be moved inwardly with respect to the automobile and in the particular arrangement shown, will be freed from the tongues of the segments below in succession and during the lowering operation of the window as the tongues 15 are carried downward they will engage in the slots 16 by reason of the inclined surface 14 and by reason of the relative thickness of the lugs 12 and the segments 3.

The window may be secured in any position to which it is adjusted by any suitable locking means. In the structure shown the crank 11 is connected to a disc 17 which is provided with fingers 18 that are located in a shell 19 and in position to operate upon a band 20 that is bent star shaped. A cam 21 having plane surfaces and formed, preferably, hexagonal or octagonal, is located within the inner-most points of the band 20 and so that the band 20 will be held between the surfaces of the cam 21 and the inner cylindrical surface of the shell 19. Rotation of the cam 21 will be prevented by reason of the fact that the portions of the band will be bent and crowded towards the cylindrical surface which will cause a clutch engagement between the shell 19 and the cam 21. The fingers 18 are located between the outer-most points of the star shaped band. When, therefore, the disc 17 is rotated the points of the band 20 will be released from engagement with the shell 19. In order that the crank 11 may rotate, the pinion 4 is connected to the cam 21 and the cam is provided with a pin 22 that extends into a slot 23, formed in the top of the disc. The slot 23, however, is a length sufficient to permit movement of the disc and consequently of the fingers 18 sufficient to permit the fingers to relieve the spring band 20 from its engaging relation with the cylindrical surface of the shell 19. On continued movement of the crank 11, the pin 22 will be engaged and the rotation of the crank 11 will be communicated to the pinion and consequently to the rack 2 to raise and lower the window. Reverse movement of the window and the rack, however, will be prevented by the clutch engagement existing between the cam 21 and the shell 19 by reason of the band 20.

I claim:

1. In a window regulator, a rack directly connected to the central part of the lower edge of the window and movable vertically and longitudinally with the window, a pinion located in the central part and in close proximity to the window opening and engaging the rack for raising and lowering the rack and the window and a crank connected to the pinion for rotating the pinion, a fixed shell for containing the rack and having interior cross dimensions substantially the same as the cross dimensions of the rack and extending substantially from the window ledge to the lowest position that the lower edge of the window is moved to for guiding the rack in raising and lowering the window.

2. In a window regulator, a segmental rack for raising and lowering the window, a pinion for engaging and operating the rack the segments of the rack having means for connecting the segments as against tensional and compressional strains and means for automatically disconnecting the segments of the rack in succession as they pass a point at one side of the axis of the pinion when the rack is moving in one direction.

3. In a window regulator, a segmental rack, for raising and lowering the window and directly connected to the central part of the lower edge of the window and movable longitudinally with the window, a pinion for engaging the rack and means located above the pinion for disconnecting the segments in succession as they pass a point above the axis of the pinion when the window is being raised.

4. In a window regulator, a segmental rack, for raising and lowering the window and directly connected to the central part of the lower edge of the window and movable longitudinally with the window, a pinion for engaging the rack and means for disconnecting the segments in succession as they pass a point above the axis of the pinion when the window is being raised, and for connecting the segments in succession as they pass the said point when moving in the reverse direction.

5. In a window regulator, a rack, a member connected to the rack for supporting the window, the rack movable vertically and longitudinally with the window, a pinion for raising and lowering the rack, a crank connected to the pinion for rotating the pinion, a shell for containing and guiding the rack and a magazine located above the pinion and communicating with the shell for receiving and restoring and delivering the segments in succession.

6. In a window regulator, a segmental rack for raising and lowering the window, a pinion for engaging the rack and means for disconnecting the segments of the rack in succession as they pass a point above the pinion when the window is being raised and for connecting the segments in succession as they pass the said point when the window is lowered, a shell for containing and guiding the rack and for pivotally supporting the pinion and having a magazine for receiving and delivering the segments as they are disconnected and connected in succession.

7. In a window regulator, a segmental member connected to the window, means for actuating the segmental member for moving the window, each segment having a positive interlocking means for connecting it with its adjoining segments as against tensional and compressional strains and means for connecting or disconnecting the segments as the window is raised and lowered.

8. In a window regulator, a segmental member connected to the window, means for actuating the segmental member for moving the window, each segment having a positive interlocking means for connecting it with its adjoining segments as against tensional and compressional strains and means for producing a lateral movement of the end of each segment relative to the end of the adjoining segment to which it is connected for connecting or disconnecting the segments as the window is lowered and raised.

9. In a window regulator, a segmental member connected to the window, means for actuating the segmental member for moving the window, the segments having T tails and slots located at their ends interfitting to connect the segments together and means for moving one adjoining end of each segment relative to the other adjoining end of each segment to connect or disconnect the segments as the window is lowered or raised.

10. In a window regulator, a segmental member connected to the window, means for actuating the segmental member for moving the window, each segment having a positive interlocking means for connecting it with its adjoining segments as against tensional and compressional strains and means for producing a lateral movement of the end of each segment relative to the end of the adjoining segment to which it is connected for connecting or disconnecting the segments as the window is lowered or raised, and a magazine for receiving the segments.

11. In a window regulator, a segmental rack connected to the window, at its lower edge, a pinion for operating on the rack and located at the lower edge of the window opening, each segment having a means located at its end for connecting it with its adjoining segment by lateral movement of one end relative to the other, means located above the pinion for producing a lateral movement of one of the ends to disconnect the segments in succession, a magazine for receiving the segments and means for causing the segments located in the magazine to be pressed against each other for establishing connection of the segments as they are drawn from the magazine by the lateral movements produced by the pressure.

12. In a window regulator a segmental member connected to the window, means for actuating the segmental member for moving the window, each segment having a positive interlocking means for connecting it with its adjoining segments as against tensional and compressional strains and a member for automatically disconnecting the end of each segment relative to the end of the adjoining segment to which it is connected and located above the point of connection of the segmental member with the window and below the means for actuating the segmental member.

13. In a window regulator a segmental member connected to the window, means for actuating the segmental member for moving the window, each segment having a positive interlocking means for connecting it with its adjoining segments as against tensional and compressional strains and a member for automatically producing a lateral movement of the end of each segment relative to the end of the adjoining segment to which it is connected for connecting and disconnecting the segments as the window is lowered or raised.

In testimony whereof I have hereunto signed my name to this specification.

HUBERT A. MYERS.